US012785014B2

(12) United States Patent
Pinheiro Pinto et al.

(10) Patent No.: US 12,785,014 B2
(45) Date of Patent: Nov. 3, 2026

(54) VACUUM HIGH VOLTAGE LIVE TANK CIRCUIT BREAKER FREE OF FLUID

(71) Applicant: EMA Electromechanics, Inc., Sweetwater, TX (US)

(72) Inventors: Joao Jose Pinheiro Pinto, Sweetwater, TX (US); Eduardo Roberto Montich, Sweetwater, TX (US)

( * ) Notice: Subject to any disclaimer, the term of this patent is extended or adjusted under 35 U.S.C. 154(b) by 342 days.

(21) Appl. No.: 18/647,139

(22) Filed: Apr. 26, 2024

(65) Prior Publication Data

US 2025/0336627 A1 Oct. 30, 2025

(51) Int. Cl.
*H01H 33/666* (2006.01)
*H01H 33/662* (2006.01)

(52) U.S. Cl.
CPC ... *H01H 33/666* (2013.01); *H01H 2033/6623* (2013.01); *H01H 2033/6667* (2013.01)

(58) Field of Classification Search
CPC ............... H01H 33/666; H01H 33/008; H01H 33/66207; H01H 2033/6623; H01H 2033/6667; H01H 2033/6665
USPC ......... 218/120, 118, 140, 153, 154; 361/626
See application file for complete search history.

(56) References Cited

U.S. PATENT DOCUMENTS 4,568,804 A * 2/1986 Luehring ......... H01H 33/66207 200/308
5,597,992 A * 1/1997 Walker ............... H01H 33/6606 218/138
7,239,490 B2 7/2007 Benke
7,397,012 B2 * 7/2008 Stepniak ................ H01H 33/02 218/139
7,724,489 B2 5/2010 Montich
7,829,814 B2 11/2010 Marchand et al.
8,174,812 B2 5/2012 Montich
8,222,556 B2 7/2012 Akesson et al.
8,320,088 B2 11/2012 Fish
8,467,166 B2 6/2013 Montich
8,642,912 B2 * 2/2014 Lee .................. H01H 33/66207 218/120

(Continued)

FOREIGN PATENT DOCUMENTS

CN 203165795 * 8/2013 ........... H01H 33/666

OTHER PUBLICATIONS

Translation of CN203165795 (Original document published on Aug. 28, 2013). (Year: 2013).*

(Continued)

*Primary Examiner* — William A Bolton
(74) *Attorney, Agent, or Firm* — Egbert, McDaniel & Swartz, PLLC

(57) ABSTRACT

A circuit breaker apparatus has a vacuum interrupter having a fixed contact and a movable contact therein, a first actuator cooperative with the movable contact so as to move the movable contact away from the fixed contact, a support insulator supporting the vacuum interrupter and adapted to insulate the vacuum interrupter from ground, a rod having one end connected to the first actuator and positioned exterior of the support insulator, and a second actuator connected to or adjacent to an opposite end of the rod. The second actuator moves the rod such that the first actuator moves the movable contact away from the fixed contact so as to open the circuit. The vacuum interrupter has a vacuum interior within a hollow insulator body.

12 Claims, 6 Drawing Sheets

(56) References Cited

U.S. PATENT DOCUMENTS

| | | | | |
|---|---|---|---|---|
| 9,190,231 | B2 * | 11/2015 | Borgstrom | H01H 33/662 |
| 9,196,439 | B2 | 11/2015 | Gentsch | |
| 9,443,681 | B2 * | 9/2016 | Siebens | H01H 33/6606 |
| 10,672,573 | B1 | 6/2020 | Montich | |
| 10,784,063 | B1 | 9/2020 | Montich | |
| 2012/0014041 | A1 * | 1/2012 | Gentsch | H01H 33/53<br>361/626 |
| 2020/0411260 | A1 | 12/2020 | Montich | |

OTHER PUBLICATIONS

Boerstn Electric Co., Ltd., "ZW7-40.5KV Outdoor Medium Voltage Vacuum Circuit Breaker (VCB)" [online]. Boerstn Electric Co., Ltd. [retrieved on Jul. 30, 2024]. Retrieved from the Internet: <URL: https://www.boerstn.com/zw7-405kv-outdoor-medium-voltage-vacuum-circuit-breaker-vcb-1591347989325068 8.html>. [Relevance: General state of the art medium voltage circuit breaker].

Ghorit, "ZW7-40.5Series Outdoor High Voltage Vacuum Circuit Breaker (Recloser)" [online], Ghorit [retrieved on Jul. 30, 2024]. Retrieved from the Internet: <URL: https://ecdn6.globalso.com/upload/p/562/source/2023-12/6572e9c4a6a9311543.pdf>. [Relevance: General state of the art medium voltage circuit breaker].

Zhejiang Volcano Electrical Technology Co., Ltd., "AC Three Phase Vacuum Circuit Breaker" [online], Zhejiang Volcano Electrical Technology Co., Ltd. [retrieved on Jul. 30, 2024]. Retrieved from the Internet: <URL: https://www.volcano-electrical.com/vacuum-circuit-breaker/ac-three-phase-vacuum-circuit-breaker.html>. [Relevance: General state of the art medium voltage circuit breaker].

* cited by examiner

VACUUM HIGH VOLTAGE LIVE TANK CIRCUIT BREAKER FREE OF FLUID

CROSS-REFERENCE TO RELATED APPLICATIONS

Not applicable.

BACKGROUND OF THE INVENTION

The present invention relates to circuit breakers. More particularly, the present invention relates to live tank circuit breakers. More particularly, the present invention relates to vacuum interrupters as used in association with live tank circuit breakers.

The interruption of electrical power circuits has always been an essential function, especially in cases of overloads or short circuits, when immediate interruption of the current flow becomes necessary as a protective measure. In earliest times, circuits could be broken only by separation of contacts in air followed by drawing the resulting electric arc out to such a length that it can no longer be maintained. This means of interruption soon became inadequate and special devices, termed "circuit breakers", were developed. The basic problem is to control and quench the high power arc. This necessarily occurs at the separating contacts of a breaker when opening high current circuits. Since arcs generate a great deal of heat energy which is often destructive to the breaker's contacts, it is necessary to limit the duration of the arc and to develop contacts that can withstand the effect of the arc time after time.

Electrical power transmission networks are protected and controlled by high-voltage breakers. The definition of high voltage varies but in power transmission work is usually thought to be 72.5 kV or higher. High-voltage breakers are nearly always solenoid-operated, with current sensing protective relays operated through current transformers. Circuit breakers can be classified as "live tank" wherein the enclosure that contains the breaking mechanism is at line potential, or "dead tank" with the enclosure at earth potential.

FIG. 1 is an illustration of a three-pole live tank circuit breaker with one interrupter per pole. It can be seen that the breaking unit 1 is located at the top part of the circuit breaker system 10. This breaking unit 1 will contain the movable contact and the fixed contact therein. The breaking unit 1 is formed of a porcelain or polymer material. The breaking unit 1 will keep the circuit breaker current carrying contacts such that the contacts remain closed during normal operation and open when the circuit breaker system 10 is tripped on account of a fault in the circuit or a manual breaker is opened. Since the breaking unit 1 is a top tank that carries the high-voltage contacts of the breaking system 10, this type of breaking unit 1 is called a "live tank" circuit breaker.

In FIG. 1, there is shown a support insulator to that is affixed to the bottom of the breaking unit 1. A support structure 3 extends below the support insulator 2. An operating mechanism 4 is provided so as to be cooperative with each of the phases 4*a*, 4*b* and 4*c* of the circuit breaker system 10. The operating mechanism 4 is functional so as to separate the movable contact from the fixed contact within the interior of each of the breaking units 1. A trip mechanism 5 is located adjacent to the support insulator 2 and on the support structure 3. Trip mechanism 5 serves to actuate the movable contact so as to move away from the fixed contact so as to break the passage of electrical energy therethrough. Trip mechanism 5 can also be used so as to reestablish contact between the movable contact and the fixed contact.

The trip mechanism 5 is connected to a pull rod 7 within a protective tube. A position indicator 8 is used in association with the mechanisms associated with the circuit breaker system 10 so as to provide a humanly perceivable signal as to whether the circuit breaker has been tripped or not.

A vacuum circuit breaker uses the rapid dielectric recovery and high dielectric strength of the vacuum. The pair of contacts are hermetically sealed in the vacuum envelope. An actuating motion is transmitted through bellows to the movable contact. When the electrodes are parted, an arc is produced and supported by a metallic vapor boiled from the electrodes. Vapor particles expand into the vacuum and condense on solid surfaces. At natural current zero, the vapor particles disappear and the arc is extinguished.

FIG. 2 shows the construction of a vacuum interrupter 20 in accordance with the prior art. As can be seen, the vacuum interrupter 20 includes an insulator body 21 that contains a movable contact 22 and a movable conductor 23. A bellows shield 24 is supported upon a bellows 25. A movable terminal 26 bears against one side of the bellows 25 so as to act upon the movable conductor 23 so as to move the movable conductor 23 and the attached movable contact 22 toward or away from the fixed contact 27. The fixed contact 27 is supported by a fixed conductor 28. Ultimately, when the movable contact 22 is closed to the fixed contact 27, the transmission of electrical energy will pass from the movable conductor 23 into the fixed conductor 28 and ultimately to a fixed terminal 29. The power can pass outwardly of the vacuum interrupter 20 from the fixed terminal 28. A flange 30 seals the interior of the insulator body 21 in a vacuum condition. Similarly, a flange 31 is fixed to the bottom of the insulator body 21 and also serves to seal the interior of the vacuum interrupter 20 in a vacuum condition. An arc shield 32 is positioned around the movable contact 22 and the fixed contact 27 so as to prevent any arcs from passing toward the insulator body 21. In normal operation, the bellows 25 will expand so as to move the movable conductor 23 and the movable contact 22 toward the fixed contact 27 and the fixed conductor 28. When the movable terminal 26 moves away from the insulator body 21, the movable contact 22 will separate from the fixed contact 27 so as to act to break the transmission of electrical energy therein.

Even though the vacuum technology illustrated in FIG. 2 has existed for many years, the vacuum, by itself, is not enough for a safe operation because of dielectric requirements. It is necessary to isolate the vacuum interrupter in order to reach the required level of isolation. The vacuum interrupter can be placed inside a hollow insulator. A pulling rod that operates the vacuum interrupter must be built of an isolating material and also isolated. A common practice is to submerge the pulling rod in an isolating fluid (e.g. liquid or gas). This leads to the requirement of permanent leak control so as to prevent the risks that leaks possess.

Current technology for high-voltage breakers is SF6 gas, for isolation and arc extinction. This is in a phase-out process due to the great risk of contamination. Other high-voltage breaker manufacturers have chosen to replace the SF6 gas with another gas that is environmentally friendly. This also carries with it the operational risk of leaking during its operational life. Some other solutions, apply gas under a very high pressure (higher than SF6 pressure). This possesses the risk of damaging humans and property in the event of an explosion. As such, there is need to develop a high-voltage live tank circuit breaker that is free of liquid and/or gas and does not require any type of leak testing.

In the past, various patents have issued relating to such circuit breakers. For example, U.S. Pat. No. 7,239,490, issued on Jul. 3, 2007 to J. J. Benke, teaches a medium voltage vacuum circuit interrupter. This medium voltage vacuum circuit interrupter includes a line terminal, a load terminal, a vacuum interrupter, an operating mechanism and an elongated, insulated, generally cylindrical encapsulating housing. The vacuum interrupter includes a vacuum envelope containing a fixed contact assembly and a movable contact assembly movable between a closed circuit position in electrical communication with the fixed contact assembly and an open circuit position spaced away from the fixed contact assembly. The fixed contact assembly is electrically interconnected with the line terminal. A flexible conductor electrically connects the movable contact assembly with the load terminal. The operating mechanism moves the movable contact assembly between the closed circuit position and the open circuit position. The housing includes a first end supporting the line terminal and an opposite end supporting the load terminal. The housing encloses the vacuum interrupter, the flexible conductor and the operating mechanism.

U.S. Pat. No. 7,829,814, issued on Nov. 9, 2010 to Marchand et al., shows a vacuum circuit interrupter having an operating mechanism structured to move the vacuum circuit interrupter contacts between a closed position and an open position. The closed position has the movable contact coupled to and in electrical communication with a fixed contact. The open position has the movable contact spaced from and not in electrical contact with the fixed contact. The vacuum circuit interrupter is structured to rotate a housing assembly between a first position in which a rotatable terminal is coupled to and in electrical communication with a line terminal and a second position wherein the rotatable terminal is coupled to and in electrical communication with a grounded terminal.

U.S. Pat. No. 8,222,556, issued on Jun. 17, 2012 to Akesson, shows a circuit breaker for high-voltage applications. This circuit breaker includes at least one supporting insulator having one end on ground potential and the other end on high-voltage potential. The end on high-voltage potential is mechanically connected to the breaking unit. A fiberoptic sensor senses the current flowing through the breaking unit. The supporting insulator is removably connected to the breaking unit. The sensor has a fiberoptic coil arranged in the high-voltage end of the supporting insulator. The circuit breaker includes a mechanism for conducting current from the breaking unit to the sensor so that current passes through the sensor coil.

U.S. Pat. No. 8,320,088, issued on Nov. 27, 2012 to R. Fish, provides a power transfer mechanism for use in transmission and distribution level electrical power systems. This mechanism allows the SCFCL system to have more than one electrical reference. Hydraulic power allows one part of the system to be referenced to ground while a second part of the system is referenced to a different voltage greater than ground. The tank of the SCFCL system is not connected to the ground.

U.S. Pat. No. 9,196,439, issued on Nov. 24, 2015 to D. Gentshe, shows a vacuum interrupter arrangement for a circuit breaker. This vacuum interrupter arrangement includes a first cylindrically-shaped vacuum insert within which a pair of corresponding electrical contacts are coaxially arranged. The electrical contacts include a fixed electrical contact which is attached to the first vacuum insert and an axially movable electrical contact which is operated by a push rod. A second cylindrically-shaped vacuum insert is coaxially arranged to the first cylindrically-shaped vacuum insert. Both vacuum inserts are coaxially surrounded by an outer vacuum container in order to form a double contact gap version.

The present Applicant has several patents issued with respect to such circuit breakers in various applications. U.S. Pat. No. 7,724,489, issued on May 25, 2010 to the present Applicant, describes a circuit breaker apparatus with an integrated grounding switch that is a housing with first and second bushings extending outwardly of the housing. A first vacuum bottle is positioned in the housing and has a pair of contactors therein. A second vacuum bottle is positioned in the housing and has a pair of contactors therein. A mechanical linkage is movable between a first position and a second position. The first position electrically connects the first bushing to the second bushing. The second position electrically connects the first bushing to ground. The first vacuum bottle and the second vacuum bottle are longitudinally aligned. The mechanical linkage is interposed between the first and second vacuum bottles.

U.S. Pat. No. 8,174,812, issued on May 8, 2012 to the present Applicant, shows a mechanically-interlock transfer switch apparatus that has first, second and third electrical terminals extending outwardly from the housing. A first vacuum bottle is positioned in the housing and has a pair of contactors therein. A second vacuum bottle is positioned in the housing and has a pair of contactors therein. A mechanical linkage is movable between a first position and a second position. The first position electrically connects the first electrical terminal to the second electrical terminal. The second position electrically connects the third electrical terminal to the second electrical terminal. The first vacuum bottle and the second vacuum bottle are longitudinally aligned. The mechanical linkage is interposed between the first and second vacuum bottles.

U.S. Pat. No. 8,467,166, issued on Jun. 18, 2013 to the present Applicant, teaches a circuit breaker with a high-speed mechanically-interlocked impedance grounding switch. The switch has a first electrical terminal, a second electrical terminal, a third electrical terminal, a first vacuum bottle with a pair of contactors therein, a second vacuum bottle with a pair of contactors therein, and a mechanically-interlocked linkage electrically interconnected to the second electrical terminal and movable between a first stable position and a second stable position. One of the pair of contactors of the first vacuum bottle is connected the first electrical terminal. One of the pair of contactors of the second vacuum bottle is electrically interconnected to the third electrical terminal. The linkage has a temporary position between the first and second stable positions electrically connecting simultaneously the first electrical terminal to the second electrical terminal and third electrical terminal to the second electrical terminal.

U.S. Pat. No. 10,672,573, issued on Jun. 2, 2022 the present Applicant, provides a gas-insulated grounding switch. This gas-insulated grounding switch has a circuit breaker apparatus that is a housing, an electrical power inlet, an electrical power outlet, a main circuit breaker, a grounding switch, and a mechanical linkage. The main circuit breaker and the grounding switch each have a pair of contactors therein. The mechanical linkage is movable between a pair of positions in which one of the positions causes the pair of contactors of the main circuit breaker to close and the pair of contactors of the grounding switch to open and another position in which the pair of contactors of main circuit breaker open and such that the pair of contactors of the grounding switch are closed. The housing has an interior that is filled with an isolating gas.

U.S. Pat. No. 10,784,063, issued on Sep. 22, 2022 the present Applicant, describes a circuit breaker apparatus that is a housing, an electrical power inlet, an electrical power outlet, a main circuit breaker, a grounding switch, and a mechanical linkage. The main circuit breaker and the grounding switch each have a pair of contactors therein. The mechanical linkage is movable between a pair of positions in which one of the positions causes the pair of contactors of the main circuit breaker to close and the pair of contactors of the grounding switch to open and another position in which the pair of contactors of the main circuit breaker are open and such that the pair of contactors the grounding switch are closed. The housing has an interior that is filled with air. The main circuit breaker and the grounding switch are in non-longitudinal alignment.

U.S. Patent Application Publication No. 2020/0411260, published on Dec. 31, 2022 the present Applicant, provides a distribution grounding switch for an electrical distribution network that has a first electrical terminal adapted to connect to a mains line, a second electrical terminal connectable to a lateral line, a first vacuum bottle having a pair of contactors therein, a second vacuum bottle having a pair of contactors therein, and a magnetic linkage cooperative with one of the pair of contactors of the first vacuum bottle and one of the pair of contactors of the second vacuum bottle so as to cause the pair of contactors of the first vacuum bottle to close while generally simultaneously causing the pair of contactors of the second vacuum bottle to open. The mechanical linkage also causes the pair of contactors of the first vacuum bottle to open generally simultaneously with the closing of the pair of contactors of the second vacuum bottle.

It is an object of the present invention to provide a circuit breaker apparatus that utilizes no liquid or gas.

It is another object of the present invention to provide a circuit breaker apparatus that requires no leak testing.

It is another object of the present invention to provide a circuit breaker apparatus that can be safely operated.

It is a further object of the present invention to provide a circuit breaker apparatus that does not require an isolating fluid.

It is a further object of the present invention to provide a circuit breaker apparatus that minimizes maintenance.

It is a further object of the present invention to provide a circuit breaker apparatus that reduces failures.

It is still another object of the present invention to provide a circuit breaker apparatus that allows for easy assembly at the job site.

It is still a further object of the present invention to provide a circuit breaker apparatus that does not require gas or liquid filling machinery at the job site.

It is a further object of the present invention to provide a circuit breaker apparatus which minimizes the volume of air between the insulator body and the vacuum interrupter.

It is another object of the present invention to provide a circuit breaker apparatus that reduces the risk of solidification and breaking of components at low temperatures.

It is a further object of the present invention to provide a circuit apparatus that has less risk of damage as a result of vacuum interrupter failure.

It is a further object of the present invention to provide a circuit breaker apparatus that has less risk of explosion.

It is still another object of the present invention to provide a circuit breaker apparatus in which the components are 100% ecological.

It is still another object of the present invention to provide a circuit breaker apparatus that does not require dielectric gases or liquids.

These and other objects and advantages of the present invention will become apparent from a reading of the attached specification and appended claims.

SUMMARY OF THE INVENTION

The present invention is a circuit breaker apparatus that comprises a vacuum interrupter having a fixed contact and a movable contact therein, a first actuator cooperative with the movable contact so as to move the movable contact from a closed position to an open position, a support insulator is connected to the vacuum interrupter so as to space the vacuum interrupter from a surface, a rod has one end connected to the first actuator is positioned exterior of the support insulator, and a second actuator is connected to or adjacent to an opposite end of the rod. The second actuator moves the rod such that the first actuator moves the movable contact to the closed position. The movable contact is movable between the open position in which the fixed contact is in spaced relation to the movable contact and the closed position in which the fixed contact is in electrically conductive relation to the movable contact. The vacuum interrupter is positioned within the interior of a hollow isolator body.

A pedestal is adapted to support the circuit breaker apparatus above the earth. The second actuator is affixed to the pedestal. The pedal supports the support insulator. The operating mechanism is mechanically linked to the second actuator. The operating mechanism cooperates with the second actuator. The operating mechanism causes the second actuator to move the rod in relation to a power condition of a power supply. Specifically, when a fault is detected, the operating mechanism will cause the second actuator to move the rod such that the first actuator moves the movable contact from the closed position to the open position. The power supply has three phases. The second actuator is responsive to at least one phase of the three phases. There is one operating mechanism per phase so as to be independently operated.

The rod is a pulling rod adapted to create a force on the first actuator so as to move the movable contact from the open position towards the fixed contact. In particular, the rod is a longitudinal member extending in spaced relation to an exterior of the support insulator. The rod extends in a vertical orientation between the first actuator and the second actuator. The rod is formed of a solid non-conductive material. In the preferred embodiment of the present invention, this non-conductive material is an epoxy glass having a coating of silicone on an exterior thereof. The support insulator is solid and formed of a non-conductive material.

A silicone elastomer is interposed between the vacuum interrupter and the hollow insulator body so as to seal a space therebetween. The silicone elastomer is a two-component silicone elastomer in the form of a ring that seals the space between the inner wall of the hollow insulator body and the exterior wall of the vacuum interrupter. The circuit breaker apparatus of the present invention is free of fluid.

In the present invention, it should be noted that the pulling rod is positioned exterior of the supporting isolator. The supporting isolator is solid on the interior thereof. The pulling rod also acts as an isolator. The positioning of the pulling rod on the exterior of the support isolator assures a long life with almost no maintenance and no risk of leaks. Since vacuum interrupter technology is a proven technology, it is very unlikely that the vacuum interrupter would lose its vacuum or fail in other ways. The present invention avoids the use of any fluid on the interior of the assembly. As such, the assembly at the job site becomes easier. There is no need to being gas or liquid-filling machinery to the site.

The present invention is also a circuit breaker apparatus that comprises a vacuum interrupter having a fixed contact and a movable contact, a hollow insulator body extending around an exterior of the vacuum interrupter, a silicone elastomer interposed between the vacuum interrupter and the hollow insulator body so as to seal a space therebetween, a solid support isolator supporting the isolator which separates the line potential from the ground, and a first actuator interconnected to the movable contact of the vacuum interrupter so as to move the movable contact from the closed position to the open position. The movable contact is movable between the open position in the closed position. The open position has the fixed contact in spaced relation to the movable contact. The closed position has the fixed contact in electrically conductive relation to the movable contact. The vacuum interrupter has a vacuum interior.

The rod has one end connected to the first actuator. The rod is positioned exterior of the support isolator and an exterior of the hollow insulator body. The silicone elastomer is a two-component silicone elastomer. Specifically, the silicone elastomer is a ring positioned around the vacuum interrupter in an area adjacent to the first actuator.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
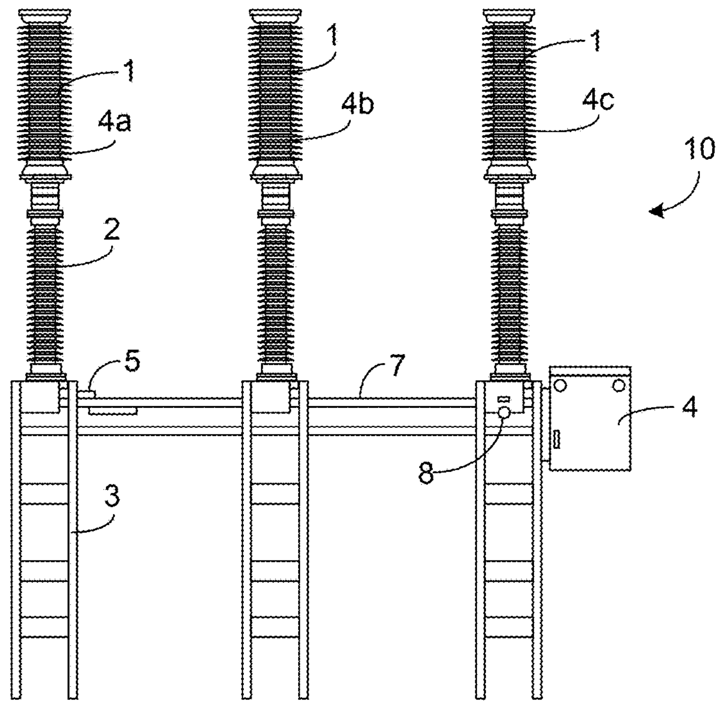
FIG. 1 PRIOR ART
FIG. 1 is a side elevational view showing a live tank circuit breaker of the prior art.
Figure 2:
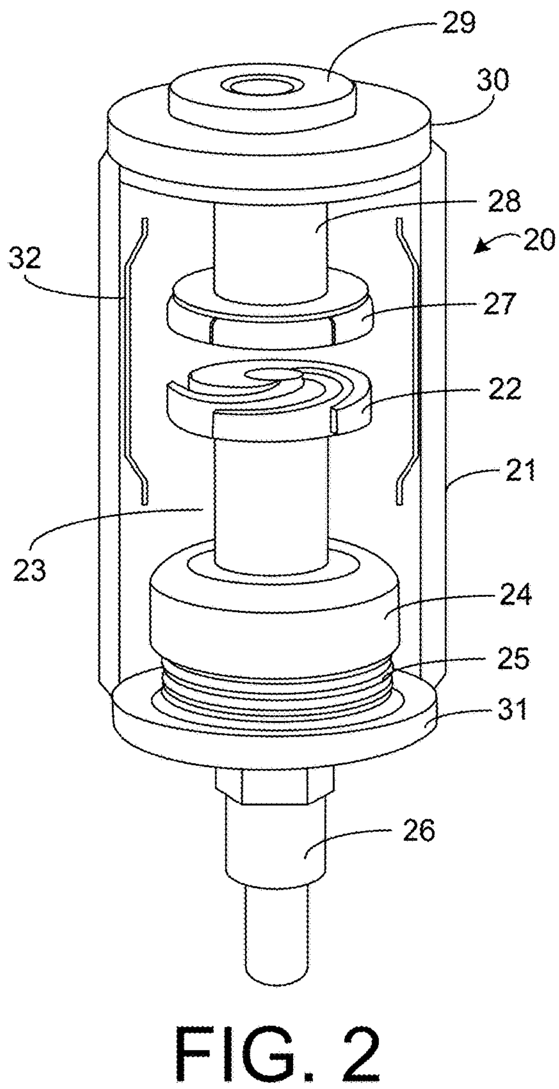
FIG. 2 PRIOR ART
FIG. 2 is a cut-cutaway perspective view of a vacuum interrupter.
Figure 3:
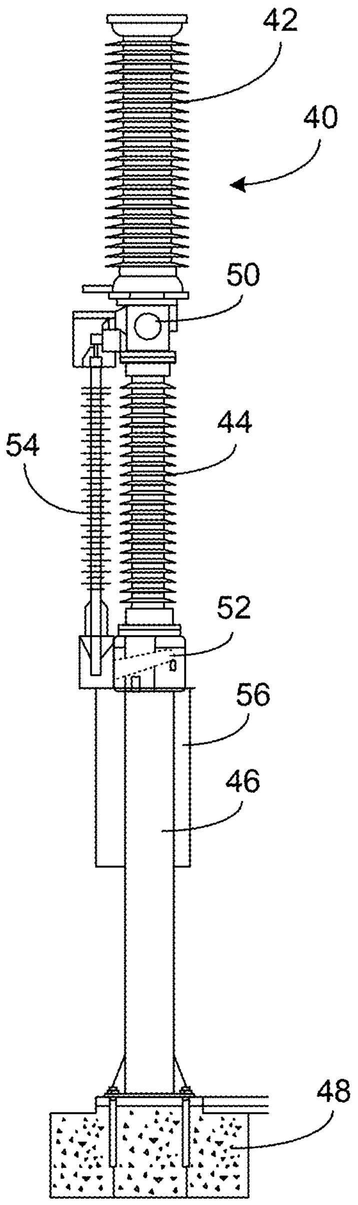
FIG. 3 is a side elevational view of the circuit breaker apparatus of the present invention.

Referring to FIG. 3, there is shown a circuit breaker apparatus 40 in accordance with the teachings of the present invention. In particular, the circuit breaker apparatus 40 includes a vacuum interrupter 42 that is mounted upon a support insulator 44. Support insulator 44 is positioned upon a pedestal 46. Pedestal 46 is mounted to a concrete base 48 which can be implanted in the earth such that the circuit breaker apparatus 40 is supported above the earth. A first actuator 50 is positioned at the bottom of the vacuum interrupter 42 and positioned above the support isolator 44 and a second actuator 52 is illustrated as positioned on the top of the pedestal 46 and below the support isolator 44. A rod 54 will extend between the first actuator 50 and the second actuator 52. An operating mechanism 56 is shown as affixed to the pedestal 46 generally at a location below the second actuator 52 if in a three-phase operation (or below each phase when in a single phase operation). The operating mechanism 56 will allow electrical power to pass to the vacuum interrupter 42 so as to manage the operation of the second actuator 52. In the event of a fault, the operating mechanism 56 will trip and move the second actuator 52 which will pivot an arm and cause the rod 54 to move upwardly in order to cause the fixed contact and the movable contact within the vacuum interrupter 42 to open. The first actuator 50 and the second actuator 52 are illustrated in greater detail in association with FIGS. 5*a* and 5*b* herein.

The rod 54 is a pulling rod that is adapted to create a pulling force on the first actuator 50 so as to move the movable contact to a position toward the fixed contact. It can be seen that the rod 54 is a longitudinal member extending in spaced relation to an exterior of the support isolator 44. In FIG. 3, the rod 54 has a generally vertical orientation between the first actuator 50 and the second actuator 52. However, within the concept of the present invention, the rod 54 could assume other orientations. The rod is formed of a solid non-conductive material. In the preferred embodiment the present invention, the non-conductive material of rod 54 is an epoxy glass having a coating of silicone on an exterior thereof.

The support isolator 44 is solid and also formed of a non-conductive material. Support isolator 44 serves to insulate the vacuum interrupter 42 from the pedestal 46 and from other structures.

Figure 4:
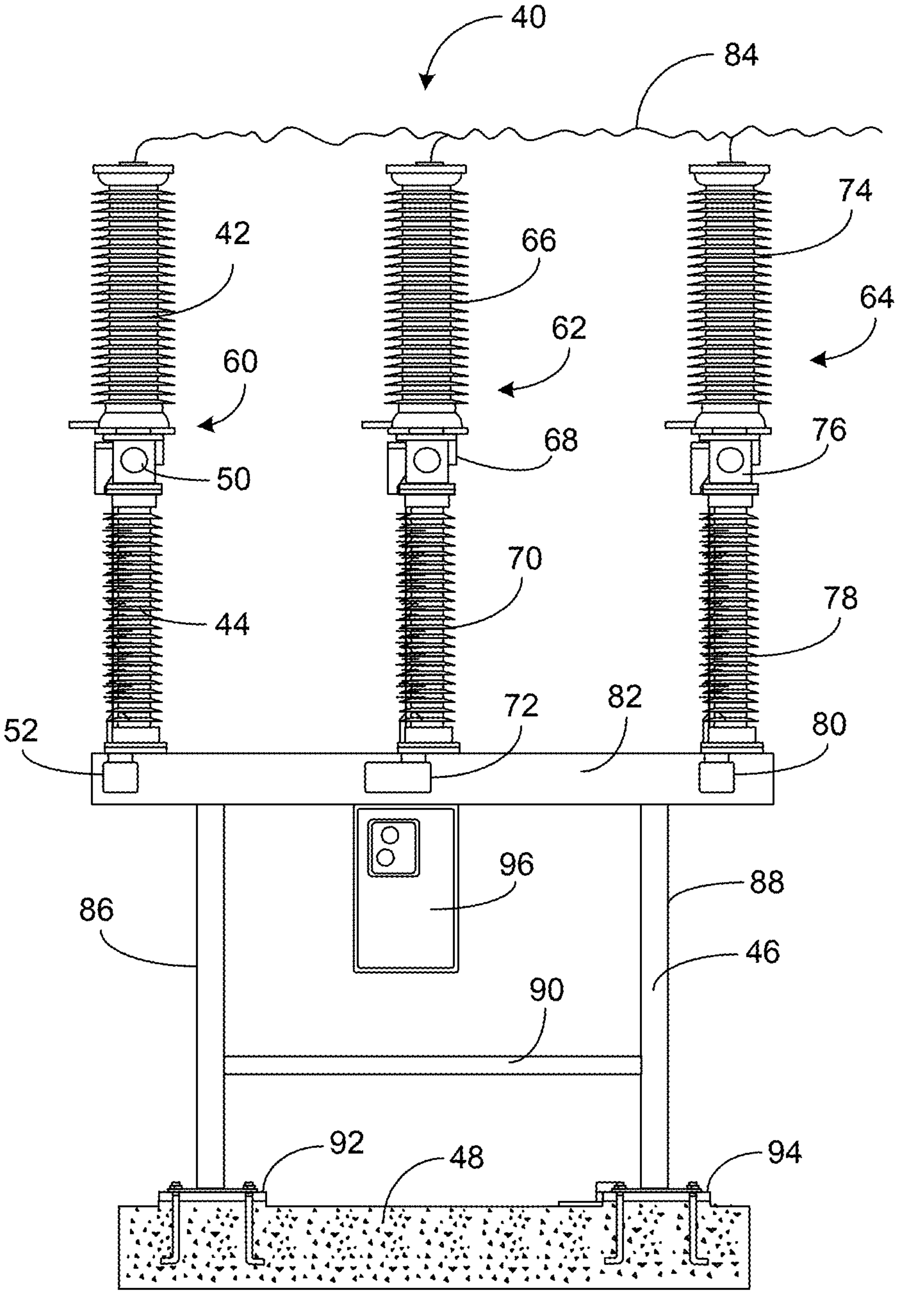
FIG. 4 is a frontal view showing the circuit breaker apparatus of the present invention.

FIG. 4 shows a frontal view of the circuit breaker apparatus 40 of the present invention. It can be seen that there are three poles 60, 62 and 64 each having identical configurations. In particular, these poles 60, 62 and 64 will correspond to the three phases of electrical energy passing therethrough. The pole 60 will include the vacuum interrupter 42, the first actuator 50, the support isolator 44 and the second actuator 52. Pole 62 will also include a vacuum interrupter 66, a first actuator 68, a support isolator 70 and a second actuator 72. The third pole 64 will also include a vacuum interrupter 74, a first actuator 76, a support isolator 78 and a second actuator 80. Ultimately, the operating mechanism 56 is illustrated as mounted below a cross beam 82 of the pedestal 46. Operating mechanism 56 opens and closes the circuit breaker so as to manage the actuators 52, 72 and 80 and allowing or cutting the flow of power through the vacuum interrupters 42, 66 and 74. Each of the vacuum interrupters 42, 66 and 74 are connected at their ends to the power grid. The pedestal 46 includes a pair of legs 86 and 88 with a crossmember 90 extending therebetween. The concrete base 48 will be connected to legs 86 and 88 through the use of brackets 92 and 94, respectively. Suitable fasteners can engage with the concrete of the concrete base 48 so as to provide a secure foundation for the circuit breaker apparatus 40.

Figure 5A:
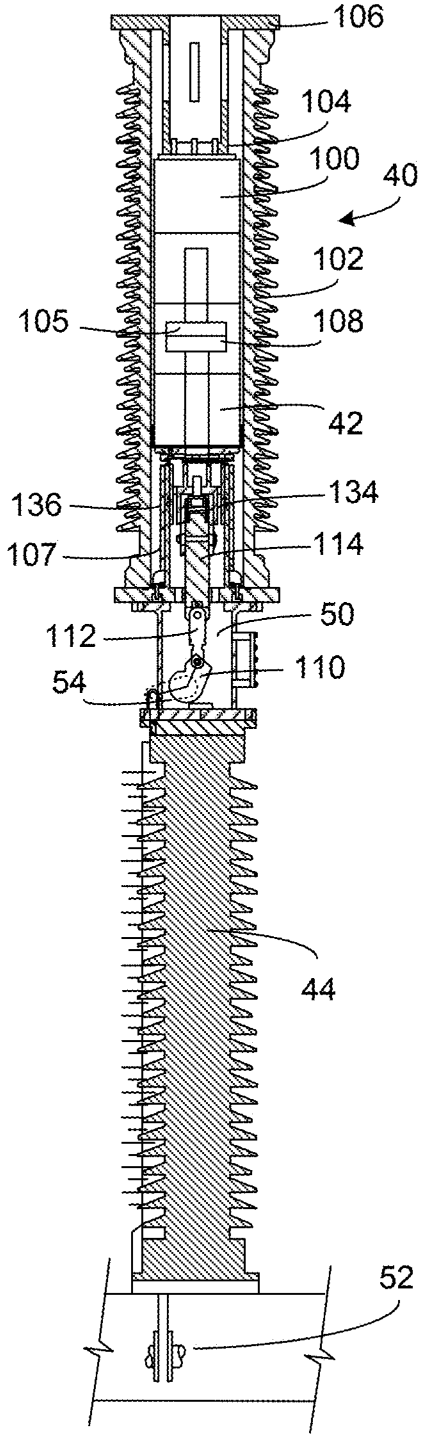
FIGS. 5*a* and 5*b* show the circuit breaker apparatus of the present invention in respective closed and open positions.
Figure 5B:
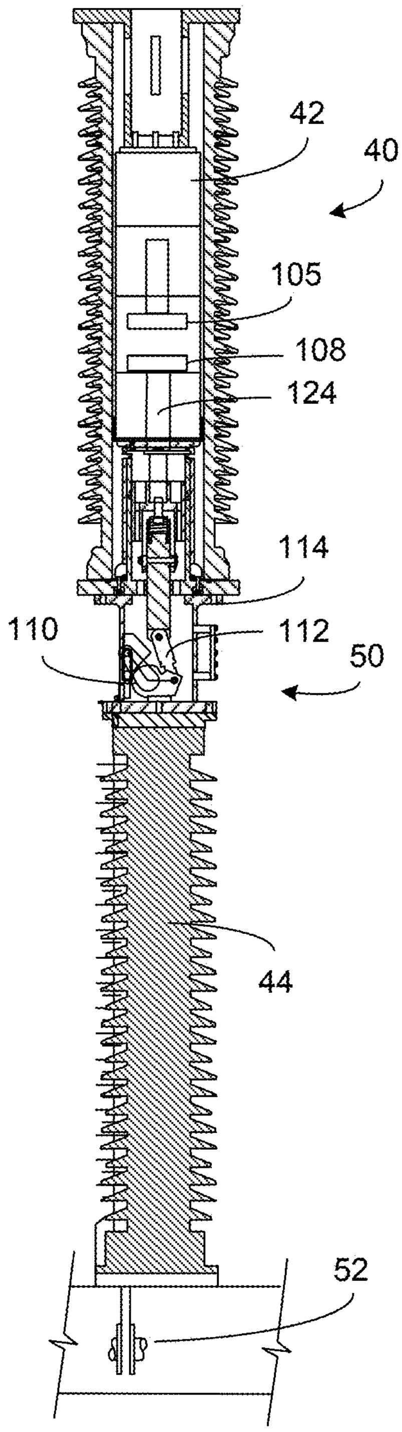

FIGS. 5*a* and 5*b* show cross-sectional views of the circuit breaker apparatus 40 of the present invention. As can be seen in each of the FIGS. 5*a* and 5*b*, the circuit breaker apparatus 40 includes the vacuum interrupter 42, the support isolator 44, the first actuator 50 and the second actuator 52. FIG. 5*a* shows the movable and fixed contacts within the interior of the vacuum interrupter 42 in a closed position. FIG. 5*b* shows the movable and fixed contacts within the interior of the vacuum interrupter 42 in an open position.

As can be seen in FIG. 5*a*, the vacuum interrupter 42 has an interior 100 that is maintained in a vacuum condition. The vacuum interrupter 42 is located within the interior of the hollow insulator body 102. A terminal 104 is located adjacent to the top of the vacuum interrupter 42 so as to transmit electrical energy from the fixed contact 105 within the interior of the vacuum interrupter 42. Ultimately, this electrical energy can flow outwardly of the circuit breaker apparatus 40 by way of a line 106.

There is a silicone elastomer 107 formed between the vacuum interrupter 42 and the hollow insulator body 102. The silicone elastomer 107 seals between the interior wall of the hollow insulator body 102 and the exterior of the vacuum interrupter 42. The silicone elastomer 107 has at least a one hundred millimeter height ring of silicone elastomer that seals the gap between the hollow insulator body 102 and the vacuum interrupter 42. Enough silicone elastomer 107 should be provided so as to provide the required electrical isolation therebetween. The silicone elastomer is a two component elastomer. This two component elastomer is specifically SLYGUARD 160 by Dow Corning. SLYGUARD 170 can also be used (if fast curing is required). The two component silicone elastomer fills this void between the vacuum interrupter 42 and the interior of the hollow isolator body 102. This allows these adjacent components to behave differently with temperature. This is because the silicone elastomer is elastic. This elastomer can resist temperatures that range from −50° C. to 200° C. The duration of the two component silicone elastomer should be longer than the life of the circuit breaker apparatus 40.

The introduction of the silicone elastomer 107 will cause the volume of remaining air between the hollow isolator body 102 and the vacuum interrupter 42 to be minimal. The reduction in the amount of air will mean less water accumulating within the space. This reduces or eliminates the risk of solidification and the breaking of components when at very low temperatures. The minimization of the amount of air will also mean less risk of damage in those circumstances where the vacuum interrupter 42 would fail. This means less risk of explosion of the hollow isolator body 102.

The silicone elastomer is 100% ecological. Since it is 100% ecological, it is not required that the manufacturer or users provide specific procedures for the final disposal of the materials and substances therein. Since no polluting products are generated during the manufacture, the present invention, through the use of this silicone elastomer, will not use dielectric gases or liquids. These can require controlled procedures in order to avoid degradation, leaks and polluting spills. Such uses are limited internationally. The configuration of the present invention, using the silicone elastomer, will not require the use of pressurized dry air, such as a dielectric (or any other non-polluting gas) in the interrupting chamber. The dielectric in the present invention is a solid insulator that includes the two component silicone, especially suitable for extreme service conditions. The two component silicone elastomer will effectively seal the space between the vacuum interrupter 42 and the hollow insulator body 102. During installation, the elastomer can be poured in as a liquid and then cured so as to transform into a flexible elastomer.

In the present invention, the insulator supporting poles are solid. The use of the solid elastomeric insulator increases the operational safety of the switch because no additional dielectrics are required. Whether the dielectrics are either gaseous or liquid, they will require long-term water tightness. This increases the risks associated with failures or explosions due to degradation or leakage. Although dry air does not pollute the environment, it is problematic in order to maintain against leakage over long periods of time. In particular, it is difficult to maintain tightness for forty years in a pressurized enclosure because very small leaks for such a long period of time can cause loss of pressure and consequently loss of insulation. This will make it necessary to permanently monitor the pressure or density so as to avoid any compromise of the performance of the equipment due to the decrease in insulation.

The present invention, through the use of the silicone elastomer, provides virtually no risk of explosion. This is because the volume of the air in the interrupting chamber is very small and is at atmospheric pressure. An internal discharge at one pole generates a minimum pressure that can be easily released with a small flow overpressure valve. If the air volume is to be reduced to zero, there is no difficulty because, the spaces between the vacuum interrupter body 102 and the vacuum interrupter 42 are filled. This leaves no air that can expand in the event of an electrical shock inside the arc chamber or inside the vacuum interrupter 42. In conventional equipment with pressurized air (or any other gas), the volume occupied by this dielectric is enormous. This is in the order of more than fifty times the volume required in the present invention. This will require safety valves that can evacuate an enormous volume of gas in a few milliseconds. In practice, these valves are often unable to remain sealed for long periods of time, especially in extreme weather conditions. In addition, the valve fails to open, the pole of the affected phase can explode so as to result in extreme danger to persons and adjacent equipment at the substation. When accidents of this type occur, there are enormous delays associated with restoring the electrical service. This is because the damage to the equipment and to the equipment nearby is significant.

Additionally, it is noteworthy to the present invention, that the insulated pulling rod 54 will transmit the movement of the operating mechanism of the vacuum interrupter 42. The insulated pulling rod 54 is located on the outside of the support insulator 44. This, in combination with the silicone elastomer (i.e. the solid insulator mentioned hereinabove) makes it possible to dispense with a liquid or gaseous dielectric in the isolation of the phase from the ground. The motion transmission mechanism of the present invention is designed in such a way that during the closed switched position, the insulating connecting rods are subjected to tensile stress. This prevents the possibility of buckling. In contrast, in the prior art, an insulating bar with a high leakage line is required for these voltage levels. The length of the insulating bar can cause it to buckle when subjected to high compressive stress for a long period of time. In the open position, the connecting rod of the present invention has no difficulty in withstanding compressive stresses since they are negligible. As such, the connecting rod will not buckle.

FIG. 5*a* shows that the fixed contact 105 is closed with respect to the movable contact 108. The insulated pulling rod 54 (as shown in FIG. 3) transmits the movement of the operating mechanism to the vacuum interrupter 42 and is located on the exterior of the support isolator 44. As can be seen, a rocker arm 110 will be secured to an end of the insulated pulling rod 54. When the insulated pulling rod 54 is moved downwardly, this will cause a pivoting of the rocker arm 110 of the first actuator 50 such that the push rod 112 moves upwardly so as to cause the internal pushing rod 114 to move upwardly. This urges against the sliding contact 136 so as to urge the movable contact 108 into its closed position (as shown in FIG. 5*a*). A spring 136 located within a cavity of the sliding contact 134. Spring 136 causes electrical communication between the sliding contact 134 and the stationary contact 140. Another spring 160 helps to press upwardly the sliding contact 134 pushed by the internal pushing rod 114 when the moveable contact 108 moves to its closed position.

In normal use, electrical energy can flow through the internal pushing rod 114, through the spring 136, through the sliding contact 134, through the movable contact 108, and into the fixed contact 105. Ultimately, the electrical energy wall flow from the fixed contact 105 to the terminal 104 and to the line 106. This electrical communication is broken when the movable contact separates from the fixed contact 105. This "break" is shown in FIG. 5*b* hereinafter.

FIG. 5*b* shows that the first actuator 50 has been actuated by the insulated pulling rod 54 so as to move the movable contact 108 away from the fixed contact 105. In particular, the insulated pulling rod 54 moves upwardly by actuation from the second actuator 52 so as to cause the rocker arm 110 to pivot about a pivot point. This causes the push rod 112 to pull the internal pushing rod 114 downwardly. In turn, this causes the connected rod 124 to urge the movable contact 108 away from the fixed contact 105. As such, the circuit is broken.

The second actuator 52 will have a pivoting lever 116 therein. This pivoting lever 116 will act on an arm. When a fault is detected in the electrical power supply, the pivoting lever of the second actuator 52 will pivot so as to urge the insulated pulling rod 54 upwardly. This, in turn, will cause the rocker arm 110 of the first actuator to pull the push rod 112 downwardly, which, in turn, causes the internal pushing rod 114 to move downwardly. As a result, the rod 124 will cause the movable contact 108 to separate from the fixed contact 105.

Figure 6A:
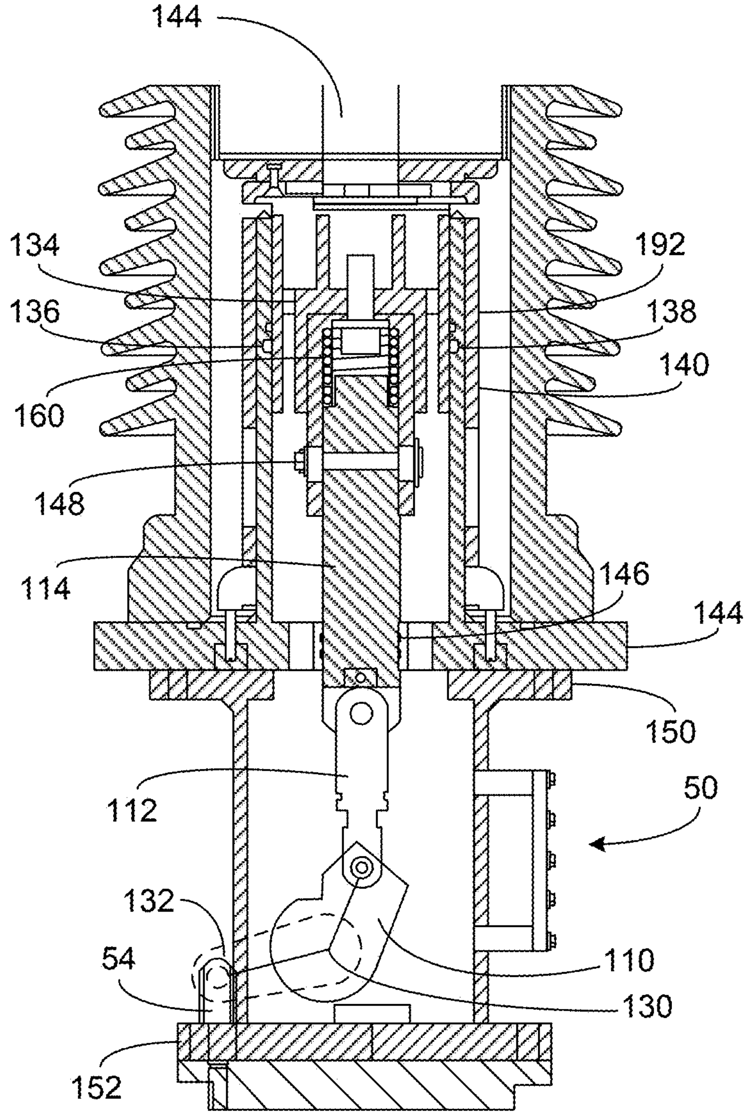
FIGS. 6*a* and 6*b* show the circuit breaker apparatus of the present invention during a detailed view of the operation of the first actuator in associated with the respective closing and opening of the circuit breaker apparatus.
Figure 6B:
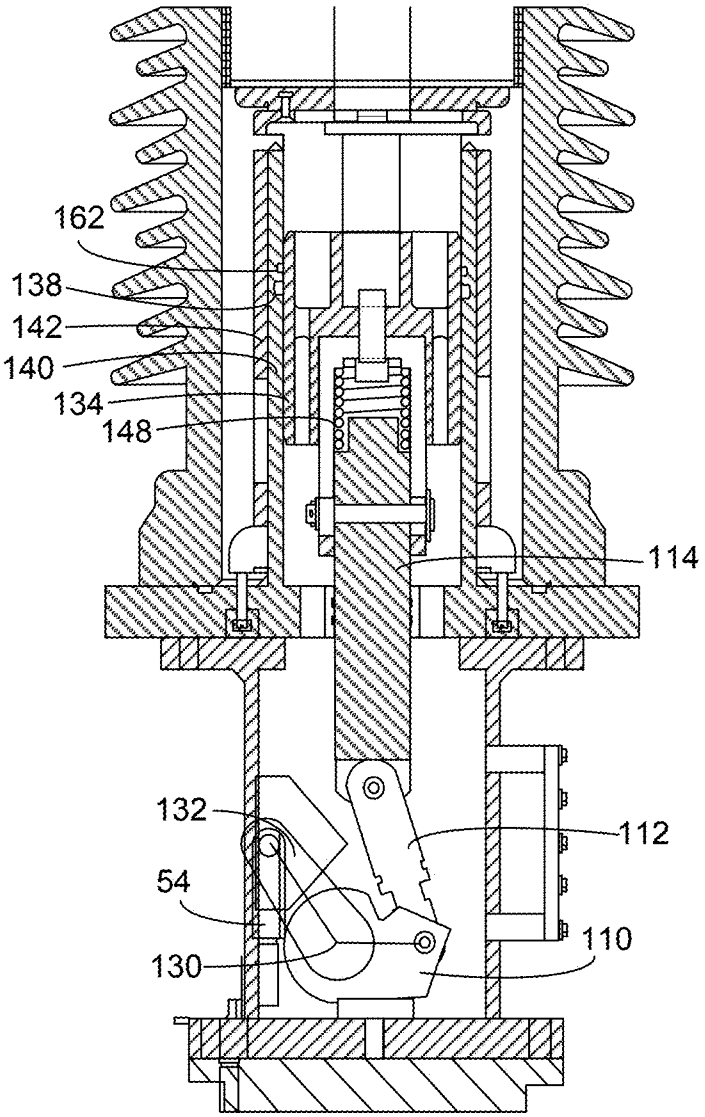

FIGS. 6*a* and 6*b* show details associated with the first actuator 50 associated with the closing and opening of the circuit breaker apparatus 40 of the present invention. FIG. 6*a* shows the circuit breaker apparatus with the movable and fixed contacts in a closed position. FIG. 6*b* shows the movable contact in the fixed contact in an open position.

In FIG. 6*a*, it can be seen that the rocker arm 110 pivots about pivot point 130 by the action of a linkage 132 connected to an end of the insulated pulling rod 54. A downward movement of the insulated pulling rod 54 (during normal operation of the circuit breaker apparatus) will cause the rocker arm 110 to pivot upwardly. This urges the push rod 112 upwardly. The push rod 112 urges the internal pushing rod 114 upwardly. The upper end of the internal pushing rod 114 is joined with the sliding contact 134 through spring 160. Spring 136 (located in cavity 138) is responsible for electrical transmission between stationary contact 140 and sliding contact 134. A contact spring cavity 138 is formed in a wall of the stationary contact 140. The upward movement of the internal push rod 114 will urge the sliding contact 134 upwardly toward the fixed contact. The spring 136 will be in electrical communication between the sliding contact 134 and stationary contact 140.

FIG. 6*a* shows that the housing 142 is secured to a base 144 of the hollow insulator body 102. The internal pushing rod 114 is guided and maintained in sealed relationship with the base 144 by virtue of O-ring seals 146. Seals 146 are formed of TEFLON™ and will prevent any liquid intrusion into the interior of the housing 140. A pin 148 secures the internal pushing rod 114 to the sliding contact 134.

FIG. 6*a* further shows that the first actuator 50 has one end 150 secured to the base 144 of the hollow insulator body 102. An opposite end of the first actuator 50 is a base 152 that is secured to a top of the support isolator 44.

FIG. 6*b* shows how the rocker arm 110 has been moved so as to cause the push rod 112 to move the internal pushing rod 114 downwardly in order to open the circuit and to cause the movable contact 108 to move away from the fixed contact 105 (as shown in FIGS. 5*a* and 5*b*). In particular, the insulated pushing rod 54 moves upwardly. This urges against the push rod 132 so as to force the rocker arm 110 to pivot about pivot point 130. This causes the push rod 112 to pivot with respect to the bottom of the internal pushing rod 114. Internal pushing rod 114 will move downwardly so as to cause the sliding contact 134 to move downwardly within the housing 142. Contact spring 136 is in electrical communication between sliding contact 134 and stationary contact 140. O-ring seal 162 is placed on a cavity of the inner wall of the stationary contact 140 so as to guide sliding contact 134 through stationary contact 140. O-ring seal 162 can be of a TEFLON™ material. The contact spring 136 in contact spring cavity 138 establishes electrical communication between stationary contact 140 and sliding contact 134.

Ultimately, the sliding contact 134 moves downwardly by rod 114 so as to cause the movable contact to separate from the fixed contact (as shown in FIG. 5*b*). When the movable contact is separated from the fixed contact, this will create a "break" and open the circuit.

In the present case, the insulated pulling rod 54 is positioned exterior of the supporting isolator 44. The supporting isolator 44 is solid on the interior thereof. The insulated pulling rod 54 acts as an isolator in and of itself. The positioning of the insulated pulling rod 54 on the exterior of the supporting isolator 44 assures a long life with almost no maintenance and no risk of leaks. Since the vacuum interrupter technology is a mature technology, there is virtually no risk of the vacuum interrupter 42 losing its vacuum or failing. Since there is no need for fluid in the interior of the assembly, the assembly at the job site becomes easier. There is no need to bring gas or liquid-filling machinery to the site.

The foregoing disclosure and description of the invention is illustrative and explanatory thereof. Various changes in the details of the illustrated construction can be made is the scope of the present invention without departing from the true spirit of the invention. The present invention should only be limited by the following claims and their legal equivalents.

The invention claimed is:

1. A circuit breaker apparatus comprising:

a vacuum interrupter having a fixed contact and a movable contact therein, the movable contact being movable between an open position in which the fixed contact is in spaced relation to the movable contact and a closed position in which the fixed contact is in electrically conductive relation to the movable contact, said vacuum interrupter having a vacuum interior and positioned within a hollow insulator body;

a first actuator cooperative with the movable contact so to move the movable contact from the closed position to the open position;

a support isolator supporting said vacuum interrupter, said support isolator adapted to insulate said vacuum interrupter from ground;

a rod having one end connected to said first actuator, said rod positioned exterior of said support isolator, wherein said rod is a solid non-conductive material, the non-conductive material being epoxy glass having a coating of silicone on an exterior thereof; and a second actuator connected to or adjacent to an opposite end of said rod, said second actuator moving said rod such that said first actuator moves the movable contact to the open position.

2. The circuit breaker apparatus of claim 1, further comprising:

a pedestal adapted to support the circuit breaker apparatus above the earth, said second actuator being affixed to said pedestal, said pedestal supporting said support insulator.

3. The circuit breaker apparatus of claim 1, further comprising:

a power supply; and an operating mechanism cooperative with said second actuator, said operating mechanism causing said second actuator to move said rod in relation to a power conducting condition.

4. The circuit breaker apparatus of claim 1, further comprising:

a silicone elastomer interposed between said vacuum interrupter and the hollow insulator body so as to seal a space therebetween.

5. The circuit breaker apparatus of claim 1, said rod being a pulling rod adapted to create a force on said first actuator so as to move the movable contact to the open position.

6. The circuit breaker apparatus of claim 1, said rod being a longitudinal member extending in spaced relation to the exterior of said support isolator and in spaced relation to the hollow insulator body.

7. The circuit breaker apparatus of claim 1, said rod extending in a vertical orientation between said first actuator and said second actuator.

8. The circuit breaker apparatus of claim 1, said support isolator being solid and formed of a non-conductive material.

9. The circuit breaker apparatus of claim 1, wherein the circuit breaker apparatus is free of fluid.

10. A circuit breaker apparatus comprising:

a vacuum interrupter having a fixed contact and a movable contact therein, the movable contact being movable between an open position in which the fixed contact is in spaced relation to the movable contact and a closed position in which the fixed contact is in electrically conductive relation to the movable contact, said vacuum interrupter having a vacuum interior, said vacuum interrupter positioned within a hollow insulator body;

a silicone elastomer interposed between said vacuum interrupter and the hollow insulator body so as to seal a space therebetween, wherein said silicone elastomer is two component silicone elastomer;

a support isolator connected to said vacuum interrupter, said support isolator adapted to insulate said vacuum interrupter from a surface; and a first actuator interconnected to the movable contact of said vacuum interrupter so as to move the movable contact from the closed position to the open position.

11. The circuit breaker apparatus of claim 10, further comprising:

a rod having one end connected to said first actuator, said rod positioned exterior of said support isolator and an exterior of the hollow insulator body.

12. A circuit breaker apparatus comprising:

a vacuum interrupter having a fixed contact and a movable contact therein, the movable contact being movable between an open position in which the fixed contact is in spaced relation to the movable contact and a closed position in which the fixed contact is in electrically conductive relation to the movable contact, said vacuum interrupter having a vacuum interior, said vacuum interrupter positioned within a hollow insulator body;

a silicone elastomer interposed between said vacuum interruptor and the hollow insulator body so as to seal a space therebetween, wherein said silicone elastomer comprises a ring positioned around said vacuum interrupter in an area adjacent said first actuator;

a support isolator connected to said vacuum interrupter, said support isolator adapted to insulate said vacuum interrupter from a surface; and a first actuator interconnected to the movable contact of said vacuum interrupter so as to move the movable contact from the closed position to the open position.

* * * * *